(12) United States Patent
Funakoshi et al.

(10) Patent No.: US 7,314,077 B2
(45) Date of Patent: Jan. 1, 2008

(54) TELESCOPIC COVER

(75) Inventors: Akira Funakoshi, Yamanashi (JP);
Akihiko Fujimoto, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 365 days.

(21) Appl. No.: 10/960,920

(22) Filed: Oct. 12, 2004

(65) Prior Publication Data

US 2005/0082118 A1    Apr. 21, 2005

(30) Foreign Application Priority Data

Oct. 16, 2003  (JP)  .............................. 2003-356716
Jul. 27, 2004  (JP)  .............................. 2004-218369

(51) Int. Cl.
*E06B 9/00*    (2006.01)

(52) U.S. Cl. ...................... 160/225; 160/223

(58) Field of Classification Search .................. 160/61, 160/62, 78, 80, 223, 202, 222, 224, 225; 211/172; 409/134; 267/139; 451/454; 188/196 P
See application file for complete search history.

(56) References Cited

U.S. PATENT DOCUMENTS

| 3,603,373 | A |   | 9/1971  | Loos et al. ................... 160/202 |
| 3,603,651 | A | * | 9/1971  | Weber ........................ 384/16 |
| 4,860,917 | A | * | 8/1989  | Stohr ............................ 220/8 |
| 5,377,379 | A | * | 1/1995  | Lo ................................ 15/246 |
| 5,379,480 | A | * | 1/1995  | Lo ................................ 15/246 |
| 5,570,979 | A | * | 11/1996 | Okamoto et al. ............ 409/134 |
| 6,422,290 | B1| * | 7/2002  | Tabellini ...................... 160/202 |
| 6,431,249 | B1| * | 8/2002  | Tabellini ...................... 160/222 |

2005/0045638 A1 * 3/2005 Maki et al. .................. 220/279

FOREIGN PATENT DOCUMENTS

| EP | 0875337    | 11/1998 |
| JP | 63-124446  | 8/1988  |
| JP | 2-48207    | 12/1990 |
| JP | 03-079254  | 4/1991  |
| JP | 6-11946    | 2/1994  |
| JP | 3050875    | 5/1998  |
| JP | 2000-308944| 11/2000 |
| JP | 2000-308945| 11/2000 |

OTHER PUBLICATIONS

Japanese Office Action for Application No. 2004-218369; dated Jan. 23, 2007.

* cited by examiner

*Primary Examiner*—Blair M. Johnson
(74) *Attorney, Agent, or Firm*—Staas & Halsey LLP

(57) ABSTRACT

A telescopic cover which relieves impact caused when a cover member is stopped moving and which is less meandering. A braking mechanism is provided between one of two adjacent cover members of the telescopic cover and the other of the two adjacent cover members which telescopically moves into and out of the one cover member. The braking mechanism is provided at a distal end portion of the one cover member, and has an elastic member that presses a slide member against the other cover member. When the other cover member moves relatively to the one cover member, a friction force generated by a pressing force of the slide member serves to brake the movement of the other cover member, whereby impact caused when the other cover member stops moving is relieved. The cover member in motion is always pressed by the slide member with an orientation thereof maintained.

2 Claims, 3 Drawing Sheets

TELESCOPIC COVER

BACKGROUND OF THE INVENTION

1. Field of the Invention

The present invention relates to a telescopic cover for use in a machine tool or other industrial machinery.

2. Description of Related Art

A telescopic cover that covers a feed mechanism, such as a feed shaft and a guide face of a machine tool table, to protect it from cutting fluid, chips, etc. is provided with telescopic cover members adapted to expand and contract for protection of the feed mechanism. The cover member however sometimes meanders when it is in motion, and a large impact is caused for example when it stops after a sudden motion.

In a known method to relieve such impact, there are provided telescopic cover members each formed at its distal end with a bellow seal in the form of a wiper. When one of the cover members projects at the maximum from an adjacent cover member, a stopper plate for preventing detachment formed in a rear end of the cover member is in contact with the bellow seal. An impact produced when the cover member projects is thereby relieved (refer to JP 6-11946U).

Also known is a telescopic cover having cover members each provided at a distal end thereof with a wiper clip or the like for removing chips adhered to the telescopic cover (refer to JP2000-308944A and JP2000-308945A).

Further known is a telescopic cover having cover members whose distal ends are each provided with a wiper of a rubber elastic material for preventing intrusion of chips, dusts, oils, or the like for protection of a sliding portion of a machine tool. In order to prevent the increase in friction resistance to the wipers, each wiper is fixed with a hard resin adapted for contact with a sliding face of an adjacent cover member, thus decreasing the friction resistance (refer to JP 3050875Y).

Another cover assembly is known, which includes a stationary cover, a movable cover, and a thin metallic elastic member extending from one cover face for contact with another cover face to seal a gap therebetween, whereby foreign matter adhered to the cover is removed (refer to JP 2-48207Y).

As mentioned above, the telescopic cover is generally so designed that, with a movement of a movable section, a corresponding one or more cover members are moved so that a cover region of the telescopic cover is expanded or contracted as a whole. However, there is a limit in an amount of motion of each cover member, and thus when one of the cover members reaches the stroke limit, it collides with the adjacent cover member to produce an impact. To obviate this, the first-mentioned JP 6-11946U has telescopic cover members each adapted, when projecting, to collide at its rear end with a bellow seal, whereby an impact is relieved. However, when the telescopic cover member retracts into the adjacent one to thereby contract the telescopic cover, these cover members collide with each other. Furthermore, if a gap between adjacent cover members increases due to the wearing away of their sliding parts or the like, the meander of the telescopic cover becomes large. As a result, large noise is produced, and the cover members are liable to be damaged. Although the problem of meandering is lessened in a fixed-end type telescopic cover having both ends respectively fixed to stationary and movable parts, a telescopic cover fixed only at one end is liable to meander, causing a problem.

Technical arts disclosed in the secondly and subsequently mentioned publications are devoted to remove foreign matter adhered to a surface of the telescopic cover or the like, and never contemplate to relieve collision between cover members or prevent the meandering of the telescopic cover.

SUMMARY OF THE INVENTION

The present invention provides a telescopic cover capable of reducing impact of cover members in stopping their motions and also meandering.

The telescopic cover of the present invention comprises: a plurality of cover members having different sizes and successively stacked in a telescopic manner for making relative motion respectively so as to be expandable and contractible as a whole; and braking means provided between at least two adjacent cover members in said plurality of cover members to apply pressing force to the relative motion of the adjacent cover members in a direction substantially perpendicular to the relative motion, to thereby brake the relative motion.

The braking means may be mounted on one of the two adjacent cover members to apply the pressing force to the other adjacent cover member.

The telescopic cover may further comprise a pressing-force adjusting mechanism for adjusting the pressing force applied by the braking means.

The braking means may comprise an elastic member mounted on one of the two adjacent cover members and a pressing member urged by the elastic member to press against the other of the two adjacent cover members.

Alternatively, the braking means may comprise an elastic member having one end mounted on one of the two adjacent cover members and the other end to press against the other of the two adjacent cover members.

The pressing-force adjusting mechanism may be mounted on the one of the two adjacent cover members to be in contact with the elastic member.

With the above arrangements, the cover member in motion is pressed by the braking means so that the pressing force generates a friction force serving as a braking force. Thus, the impact of cover members in stopping their motions is reduced. Further, since the cover member is always pressed by the braking means, the orientation of the cover member is retained constant, and the meandering of the telescopic cover is suppressed when it expands or contracts.

DETAILED DESCRIPTION

Figure 1:
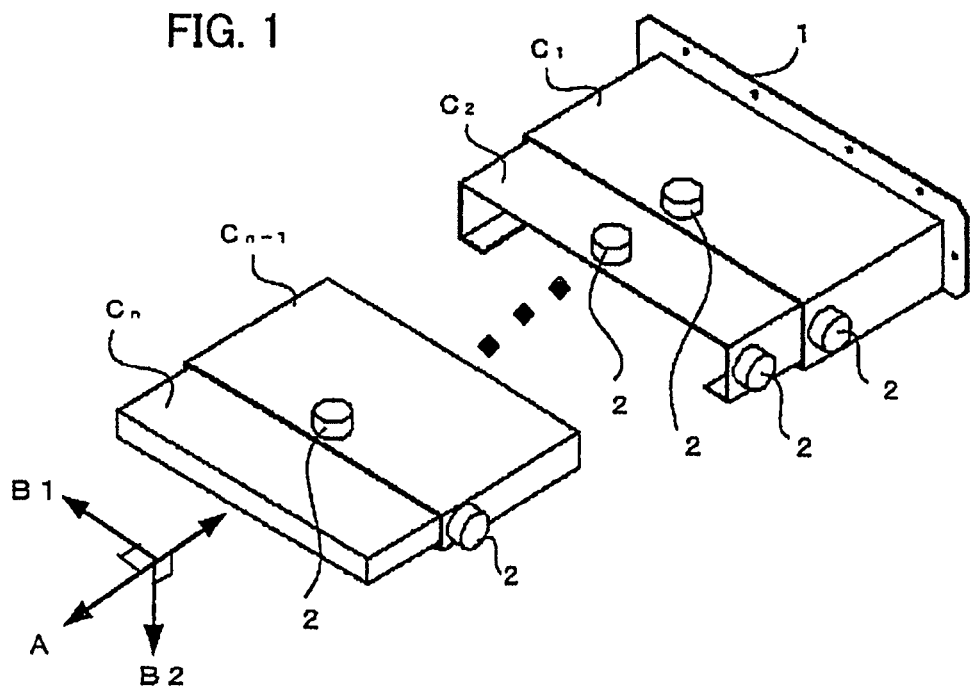
FIG. 1 is a schematic view of one embodiment of this invention.

FIG. 1 is a schematic view of a telescopic cover according to one embodiment of this invention. In this embodiment, the telescopic cover is constituted by n cover members including first to n'th cover members $C_1, \ldots, C_n$. The first cover member $C_1$ is provided with a mounting portion 1 through which the telescopic cover is mounted to a stationary section or the like. The second cover member $C_2$ is slidably fitted into the first cover member $C_1$ in a telescopic fashion. Similarly, the third cover member $C_3$ (not shown) is slidably fitted into the second cover member $C_2$. In the same way, the (i+1)'th cover member $C_{i+1}$ is slidably fitted into the i'th cover member $C_i$ in a telescopic fashion.

Braking mechanisms 2 are respectively provided at distal end portions of the i'th cover members $C_i$ (into and out of which are the (i+1)'th cover members $C_{i+1}$, where i varies from 1 to n−1). In this embodiment, the cover member is provided at an upper face and one side face thereof with the braking mechanisms 2.

Figure 2:
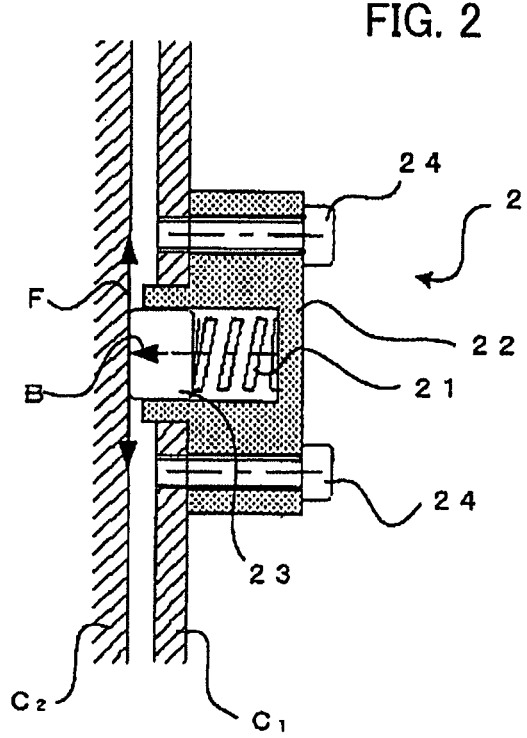
FIG. 2 is a sectional view of a braking mechanism according to the one embodiment.

FIG. 2 is a sectional view for explaining the braking mechanism 2. The braking mechanism 2 is constituted by an orientation maintaining device 22 having a central blind hole in which is received an elastic member 21 (constituted by a spring, rubber, resin, or the like, and the one constituted by a spring is shown by way of example in FIG. 2), a slide member 23 adapted to project by being urged by the elastic member 21, and fasting members 24 such as bolts by which the braking mechanism 2 is fixed to the cover member.

By fixing the orientation maintaining device 22 to the cover member $C_i$ (first cover member $C_1$ in the example shown in FIG. 2) using the fastening members 24, the braking mechanism 2 is mounted to the cover member $C_i$ in such a manner that the slide member 23 adapted to project by being urged by the elastic member 21 presses the (i+1)'th cover member $C_{i+1}$ that is slidably received in the cover member $C_i$ (first cover member $C_1$). In the example shown in FIG. 2, the braking mechanisms 2 are mounted to the cover member $C_1$ so that slide members 23 press the cover member $C_2$. The cover member $C_2$ ($C_{i+1}$) is adapted to move relative to the cover member $C_1$ ($C_i$). When the cover member $C_2$ ($C_{i+1}$) moves, it slides while being pressed by the slide members 23. Therefore, as shown in FIG. 2, a friction force F is generated that is in proportion to a pressing force B applied from the elastic member 21 to the slide member 23, whereby the cover member $C_2$ ($C_{i+1}$) is braked.

As a result, when one of the cover members of the telescopic cover moves even at a high speed, friction forces produced by pressing forces applied from the slide members 23 of the braking mechanisms 2 and serving as braking forces are applied to the moving cover member, thus preventing occurrence of a large impact when the cover member stops moving. Since the moving cover member slides on the slide members 23, it is preferable that the slide members 23 be made of brass, resin, or the like to prevent them from being worn.

In the meantime, the braking mechanism 2 may be provided on the upper face and one side face of the distal end of each cover member, as shown in FIG. 1. Alternatively, the braking mechanism 2 may be provided on only the upper face, both or only one of the side faces, or the upper and both side faces. As shown in FIG. 1, the braking mechanism 2 provided on the side face applies a pressing force B1 that exerts in a direction perpendicular to the moving direction A of the cover member, whereas the braking mechanism 2 provided on the upper face applies a pressing force B2 exerting in a direction perpendicular to the moving direction A of the cover member, generating a friction force.

As explained above, the cover member $C_{i+1}$ that moves relative to the cover member $C_i$ in a telescopic fashion is pressed by the braking mechanisms 2 provided on the upper and side faces of the cover member $C_i$. Thus, a gap between the cover members $C_i$ and $C_{i+1}$ is maintained constant, thereby suppressing a change in the orientation of the cover member $C_{i+1}$ which is moving.

Figure 3:
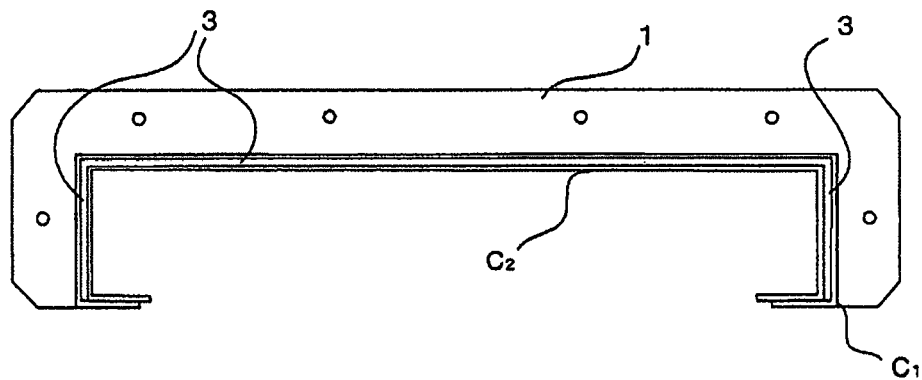
FIG. 3 is a view for explaining a gap between cover members.

FIG. 3 is a view in which a gap between the cover members $C_1$ and $C_2$ is seen from front. More specifically, FIG. 3 is a view showing the gap 3 between the cover members $C_1$ and $C_2$ in a case where the braking mechanism 2 is provided on the upper face and both the side faces of the cover member $C_1$. Gaps between the cover members $C_1$ and $C_2$ on both sides are maintained constant by means of the slide members 23 that project by being urged by the elastic members 21 of the braking mechanisms 2. In addition, a gap between the upper faces of the cover members $C_1$ and $C_2$ is also maintained constant by means of the slide member 23 provided on the upper face. As a result, the orientation of the moving cover member $C_2$ is kept unchanged.

Figure 4:
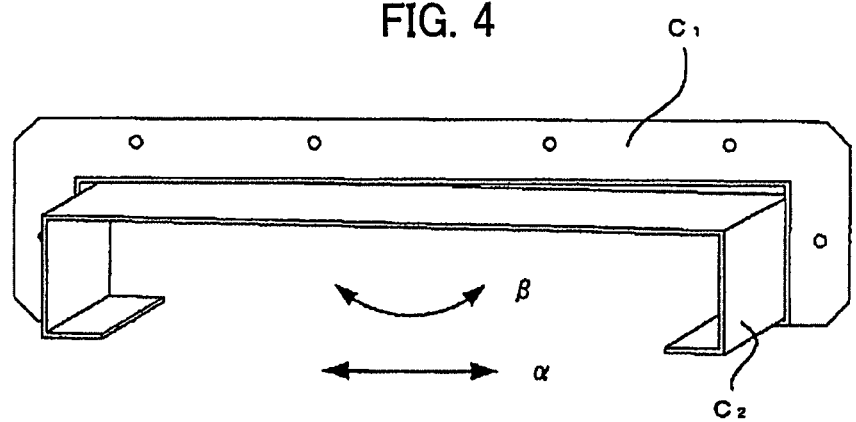
FIG. 4 is a view for explaining how to suppress a change in orientation of cover members.

FIG. 4 is a view for explaining a change in the orientation of the cover member. As in the case of FIG. 3, an explanation will be given by taking the cover members $C_1$ and $C_2$ as example. When no braking mechanism 2 is provided on the cover member $C_1$, there occurs a parallel displacement of the cover member $C_2$ in the left and right direction, as shown by an arrow α in FIG. 4. Also, the cover member $C_2$ rotates as shown by an arrow β, causing a change in the orientation of the cover member $C_2$. On the contrary, when the braking mechanism 2 is provided on both sides of the cover member $C_1$ (or provided on either one of the sides), the cover member $C_2$ is in contact with the slide members 23, whereby the gaps 3 on the both sides are maintained constant, without causing a parallel displacement in the left and right direction in FIG. 4. Also in the vertical direction, the cover member $C_2$ is always pressed by the slide member 23 of the braking mechanism 2 that is provided on the upper face of the cover member $C_1$, and no parallel displacement is caused in the vertical direction. Since the cover member $C_2$ is pressed by the slide members 23 of the braking mechanisms 2 in such a manner that the gaps between the cover members in the vertical and width wise directions are maintained constant, the cover member $C_2$ is prevented from being rotated around the moving direction and a direction perpendicular thereto, thus suppressing a change in the orientation of the moving cover member $C_2$.

Figure 5:
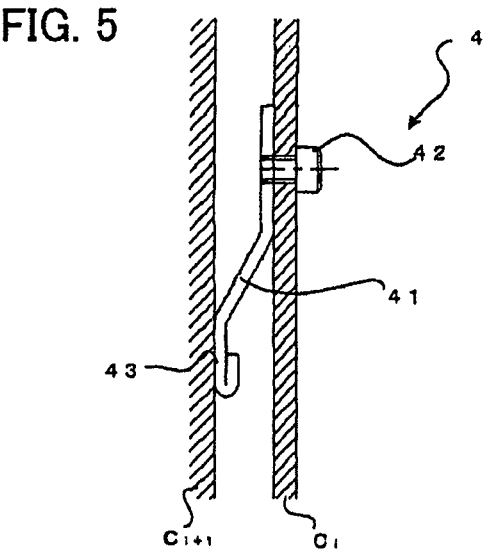
FIG. 5 is a view for explaining a braking mechanism according to a second embodiment.

FIG. 5 shows a second embodiment of the braking mechanism. This braking mechanism 4 is constituted by an elastic member 41 (the one shown by way of example in FIG. 5 is formed by a plate spring, but other elastic member made of rubber or resin may be used), and a fastening member 42 such as a screw for fixing the elastic member 41 to the cover member. As in the first embodiment, the braking mechanism 4 is fixed to a distal end of the cover member ci of the telescopic cover (instead of the braking mechanism 2 of FIG. 1, the braking mechanism 4 is mounted). Specifically, the elastic member 41 is fixed at its one end portion to a distal end of the cover member ci by means of the fastening member 42. The elastic member 41 has another end portion that is flat and adapted to press a surface of the cover member Ci+1, which is movable relative to the cover member Ci in a telescopic fashion. In this embodiment, the flat distal end of the elastic member 41 serves as the slide member 43.

When the cover member $C_{i+1}$ moves relative to the cover member $C_i$, therefore, it is always pressed by the elastic member 41. Thus, the cover member $C_{i+1}$ is braked by a friction force due to the pressing force of the elastic member 41. Moreover, the cover member $C_{i+1}$ is maintained in position by means of the elastic member 41 as viewed in the pressing direction of the elastic member 41, so that a change in the orientation of the cover member $C_{i+1}$ is suppressed. That is, the braking mechanism 4 of the second embodiment achieves the functions similar to those of the braking mechanism 2 of the first embodiment.

Figure 6:
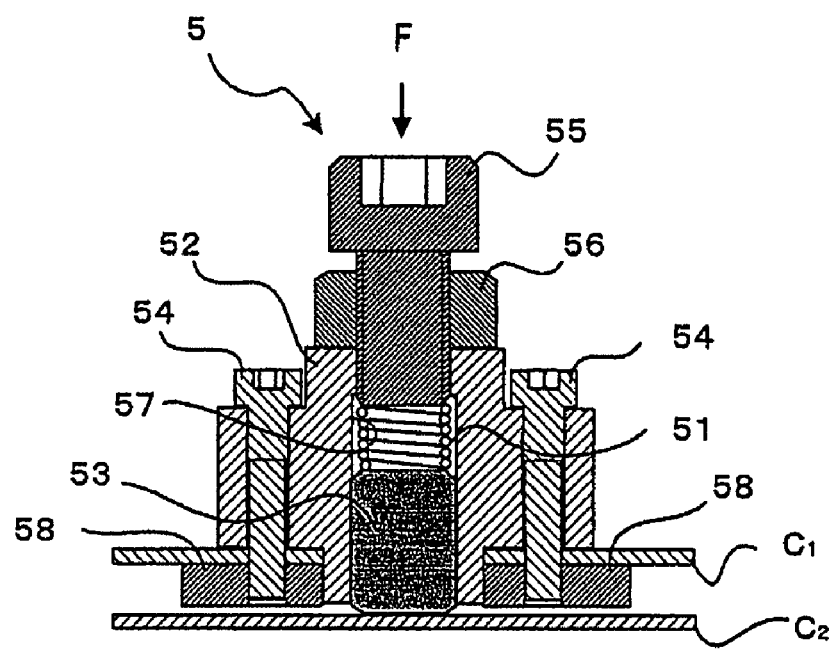
FIG. 6 is a view for explaining a braking mechanism according to a third embodiment.

FIG. 6 is a view for explaining a third embodiment of this invention. The braking mechanisms 2, 4 of the first and second embodiments produce a constant pressing force for pressing the cover member, which is determined at the time of design. Therefore, even if an excess or deficiency is caused in an actual braking force, it is difficult to make an adjustment. In this regard, it is the third embodiment shown in FIG. 6 that makes it easy to adjust the pressing force.

The braking mechanism 5 of the third embodiment is the one in which a pressing-force adjustment mechanism is added to the first embodiment. The braking mechanism 5 is comprised of an elastic member 51 such as a spring, an orientation maintaining device 52, a slide member 53, fastening members 54 such as bolts, a bolt 55, and a nut 56.

The orientation maintaining device 52 is formed at its central part with a hole 57 in which the elastic member 51 and the slide member 53 are received. The hole 57 has an upper end portion thereof formed with threads with which the bolt 55 is threadedly engaged. By means of the fastening members 54, the braking mechanism 5 is fastened to a distal end of each cover member $C_i$ (cover member $C_1$ in FIG. 6) of the telescopic cover. Used as the fastening member 54 in this embodiment is a fastening screw such as a bolt. If the cover member $C_i$ is thin in thickness, it is impossible to appropriately form a threaded portion in the cover member $C_i$ for threaded engagement with the fastening screw. For this reason, a reinforcing member 58 is fixed beforehand to the cover member $C_i$ using bolts, welding or the like, and the cover member $C_i$ and the reinforcing member 58 are tapped for threaded engagement with the threads of the fastening member 54, whereby the braking mechanism 5 is reliably mounted.

Then, the bolt 55 is threadedly engaged with the threads of the upper end portion of the hole 57, thereby pressing the slide member 53 through the medium of the elastic member (spring) 51. The slide member 53 presses a surface of the cover member $C_{i+1}$ (cover member $C_2$ in FIG. 6) that moves relative to the cover member $C_i$ in a telescopic fashion. The pressing force F for pressing the cover member $C_{i+1}$ can be increased or decreased for adjustment by increasing or decreasing an amount of screwing the bolt 55. The bolt 55 and the elastic member 51 constitute the pressing-force adjusting mechanism. In the meantime, the nut 56 threadedly engaged with the bolt 55 serves to fix the bolt 55, thereby keeping the amount of screwing the bolt 55 unchanged, even if vibration or the like is applied after completion of the pressing force adjustment.

Figure 7:
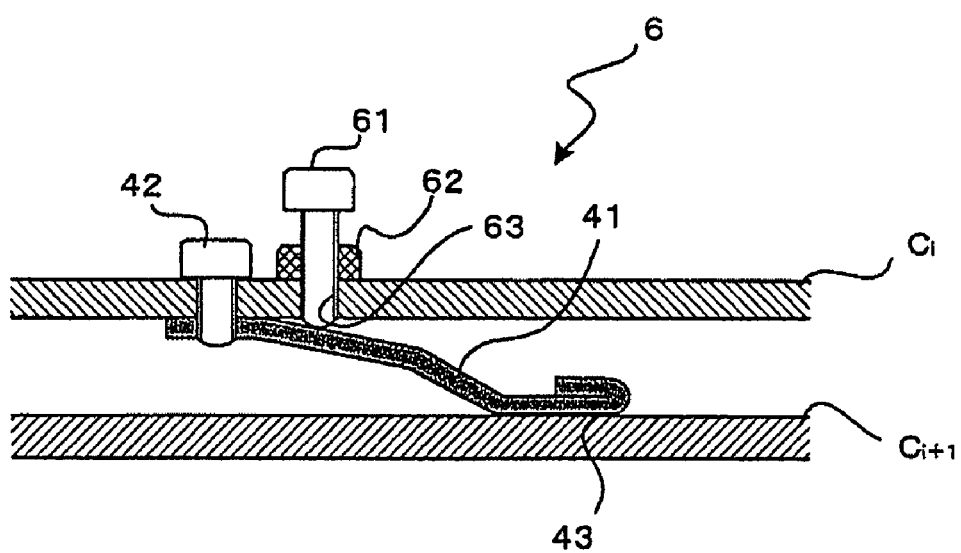
FIG. 7 is a view for explaining a braking mechanism according to a fourth embodiment.

FIG. 7 is a view for explaining a forth embodiment of this invention. This embodiment is the one in which a pressing-force adjusting mechanism is added to the second embodiment.

A braking mechanism 6 of the fourth embodiment is substantially the same in constriction as the second embodiment, but differs in that a bolt 61 and a nut 62 are added as the pressing-force adjusting mechanism. In other respect, it is the same as that of the second embodiment. The same elements as those of the second embodiment shown in FIG. 5 are denoted by the same numerals.

As with the second embodiment, the elastic member 41 is fixed at its one end to the cover member $C_i$ of the telescopic cover by means of the fastening member 42. In the vicinity of the location where the elastic member 41 is fixed, a tap hole 63 is formed in that position of the cover member $C_i$ which corresponds to a position which the elastic member 41 passes through. The bolt 61 threadedly engaged with the tap hole 63 has its distal end that is adapted for contact with the elastic member 41, and the nut 62 is threadedly engaged with the bolt 61. The pressing force of the elastic member 41 for pressing the cover member $C_{i+1}$ is determined by adjusting an amount of screwing the bolt 61 into the tap hole 63. Specifically, by adjusting the amount of screwing the bolt 61, the position of the distal end of the bolt 61 is adjusted, thereby adjusting an amount of deviation of the elastic member 41 toward the cover member $C_{i+1}$ with the distal end of the bolt 61.

After completion of the pressing force adjustment, the bolt 61 is fixed by the nut 62 to avoid a change in the amount of screwing the bolt 61 due to vibration or the like. Since the other configuration is the same as the second embodiment, a further explanation will be omitted.

In each of the foregoing embodiments, the braking mechanism 2 or 4 is fixed to the outer cover member $C_i$, and the slide member is pressed by an elastic force of the elastic member against the inner cover member $C_{i+1}$ disposed telescopically in the outer cover member $C_i$, thereby braking the movement of the cover member $C_{i+1}$ and maintaining the orientation thereof. Alternatively, the braking mechanism 2 or 4 may be fixed to the inner telescopic cover member $C_{i+1}$ and the outer cover member $C_i$ may be pressed by the slide member, thereby braking the relative movement between the cover members $C_i$ and $C_{i+1}$ and maintaining the orientation thereof.

The present invention is also applicable to an angle telescopic cover whose central part (center line of the cover member that is in parallel to the line extending in the moving direction) is raised, a telescopic cover whose opposite ends are connected to other members, or a telescopic cover having a pantograph mechanism.

What is claimed is:

1. A telescopic cover comprising:
   a plurality of cover members having different sizes and successively stacked in a telescopic manner for making relative motion respectively so as to be expandable and contractible as a whole;
   braking means provided between at least two adjacent cover members in said plurality of cover members to apply pressing force to the relative motion of the adjacent cover members in a direction substantially perpendicular to the relative motion, to thereby brake the relative motion, the braking means including an elastic member mounted on one of the two adjacent cover members and a pressing member urged by said elastic member to press against the other of the two adjacent cover members, and
   a pressing-force adjusting mechanism mounted on the one of the two adjacent cover members to be in contact with said elastic member for adjusting the pressing force applied by said elastic member.

2. A telescopic cover comprising:
   a plurality of cover members having different sizes and successively stacked in a telescopic manner for making relative motion respectively so as to be expandable and contractible as a whole;

braking means provided between at least two adjacent cover members in said plurality of cover members to apply pressing force to the relative motion of the adjacent cover members in a direction substantially perpendicular to the relative motion, to thereby brake the relative motion, the braking means including an elastic member having one end mounted on one of the two adjacent cover members and the other end to cress against the other of the two adjacent cover members, and a pressing-force adjusting mechanism mounted on the one of the two adjacent cover members to be in contact with said elastic member for adjusting the pressing force applied by said elastic member.

* * * * *

UNITED STATES PATENT AND TRADEMARK OFFICE
CERTIFICATE OF CORRECTION

PATENT NO. : 7,314,077 B2 Page 1 of 1
APPLICATION NO. : 10/960920
DATED : January 1, 2008
INVENTOR(S) : Akira Funakoshi et al.

It is certified that error appears in the above-identified patent and that said Letters Patent is hereby corrected as shown below:

Column 4, Line 57, change "ci" to --$C_i$--.

Column 4, Line 61, change "ci" to --$C_i$--.

Column 4, Line 65, change "Ci" to --$C_i$--.

Column 7, Line 8, change "cress" to --press--.

Signed and Sealed this

First Day of July, 2008

JON W. DUDAS
*Director of the United States Patent and Trademark Office*